Dec. 5, 1939.   F. A. DEUTSCH   2,182,016
FLUID RETARDING OR BRAKING DEVICE
Filed Aug. 19, 1937   2 Sheets-Sheet 1

INVENTOR.
FRITZ A. DEUTSCH
BY
Kwis Hudson & Kent
ATTORNEYS

Patented Dec. 5, 1939

2,182,016

UNITED STATES PATENT OFFICE 2,182,016

FLUID RETARDING OR BRAKING DEVICE

Fritz Albert Deutsch, Berlin, Germany

Application August 19, 1937, Serial No. 159,925
In Germany December 22, 1936

5 Claims. (Cl. 188—88)

This invention relates to a fluid retarding or braking device of the type having a piston relatively movable in a cylinder with a substantially fluid-tight fit therein.

In this type of retarding device any relative movement of the piston in the cylinder will cause a flow of fluid through orifices or openings arranged either in the piston or in the cylinder or in both. The flow of fluid through such orifices or openings may be regulated by suitable means, such as valves, to obtain by the use of the device a retarding or braking action of the desired characteristics.

A retarding device of this character may be used with various mechanism or apparatus wherein it is desirable to retard or control the velocities of relative movements between any two parts of said mechanisms or apparatus.

However, in order to clearly illustrate and describe the invention, but without any intention to limit it thereto, the invention is shown and described herein as embodied in shock absorbers particularly adapted to be used upon motor vehicles, it being understood that one relatively movable part of the device, such as the cylinder, is operatively connected with one relatively movable part of the vehicle such as the axle, while the other relatively movable part of the device such as the piston, is operatively connected with another relatively movable part of the vehicle, such as the chassis or frame.

Further, by way of illustration, the fluid retarding devices embodying the invention are shown and described herein as hydraulic retarding devices, wherein the retarding liquid may be a suitable oil.

In fluid retarding devices the valves which regulate the flow of fluid through the openings or orifices in the pistons or cylinders may be changed to obtain different retarding characteristics by the use of the device under different operating conditions and to meet different requirements.

Heretofore it has been necessary in changing the valves of fluid retarding devices, as above stated, to either disassemble the devices or to provide special openings in the casings of the devices and through which the valves are accessible.

The disassembling of the devices for this purpose makes the changing of the valves a slow and complicated performance and, in addition, in the case of hydraulic retarding devices, results in loss of the retarding liquid.

The provision of special openings in the cases of the devices and through which the valves are accessible for adjustment means more complicated and expensive constructions, particularly in instances where the devices have reservoirs surrounding the working cylinders or chambers. When such openings are provided it is necessary to furnish closure members therefor, which must be packed and tightened fully into closed position to prevent leakage of fluid with a resultant reduction in the efficient functioning of the device.

The principal object of the present invention is to provide in a fluid retarding or braking device of the character specified, means whereby the valve or valves controlling the flow of fluid upon relative movements of the cylinder and piston can be readily adjusted from exteriorly of the device without requiring the provision of openings therein or the disassembling thereof.

A further object is to provide a fluid retarding device, such as referred to in the above object, which is of economical construction, since it is not necessary to provide therein openings through which the valve or valves are accessible or closure members for said openings, together with packing for the closure members.

Another object of and advantage residing in fluid retarding devices embodying the invention is that danger of fluid leakage, which would impair the efficient operation of the devices, is reduced to a minimum.

The present invention in another of its aspects has for an object the provision in a fluid retarding device of a fluid control valve and adjustable means therefor of such character that the device can have in operation any desired or required diagrammatic characteristics, such as a mere over-pressure diagram, a mere by-pass diagram or various combinations of both of these diagrams.

The invention also in one of its phases has for an object the adjustment of the fluid-flow control valve or valves from the exterior of the device, when the relatively movable piston and cylinder are at the limits of their relative movements in opposite directions, while in a different phase of the invention an object thereof is to provide means whereby the fluid flow control valve or valves can be adjusted from exteriorly of the device, irrespective of where the piston and cylinder are in their relative movements.

Further and additional objects and advantages residing in the invention will become apparent hereinafter in connection with the detailed description of embodiments thereof which is to follow.

In attaining the objects and advantages hereinbefore set forth, the invention in its broad aspects contemplates the following:

It will be presumed that fluid retarding or braking devices, as referred to herein, include devices having a part provided with a portion located within the working cylinder or chamber and with a portion located exteriorly thereof, as, for example, the piston and piston rod wherein the piston is within the cylinder while the rod extends exteriorly thereof, or a screw cap for closing an end of the working cylinder or chamber and having a portion in communication with the interior thereof and a portion accessible from the exterior thereof. It is proposed to utilize a part having portions of this character for adjusting the valve or valves of the devices from the exterior thereof, since the portion of said part that is located exteriorly of the cylinder or working chamber furnishes the means whereby said part can be turned relatively to the cylinder or chamber.

In connection with the turning of such a part from the exterior of the device, means would be provided within the device and associated with said part and with the valve or valves to be controlled, whereby the turning of the part relative to the cylinder or chamber would effect an adjustment of said valve or valves. This means can be of such character that the adjustment of the valve or valves must take place when the piston and cylinder are at their limits of relative movements in opposite directions, or it can be of such character that the adjustment can occur at any point in the relative movements of the piston and cylinder. The adjustable valve or valves may be located either in the piston, the piston rod, the working chamber or cylinder or in some or all of such parts.

Referring to the accompanying drawings.

Figures 1, 2:
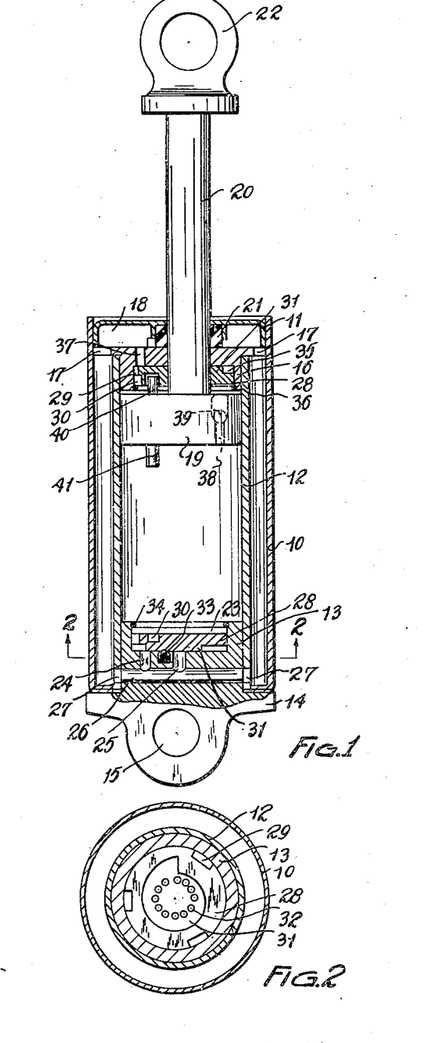
Fig. 1 is a longitudinal sectional view through a double acting hydraulic retarding device or shock absorber embodying the invention and wherein the valves controlling the relative movements between the piston and cylinder in both directions can be adjusted from exteriorly of the device.
Fig. 2 is a transverse sectional view taken substantially on line 2—2 of Fig. 1 looking in the direction of the arrows.

The retarding device shown in Figs. 1 and 2 of the drawings is of the direct and double acting type of shock absorber which may be employed advantageously upon motor vehicles although susceptible of other advantageous uses.

The shock absorber shown in these views comprises a cylindrical casing or housing 10 closed at one end by a closure cap 11 mounted and secured in the casing or housing 10 by any suitable means, such as for example by welding, wherefore the cap has a fluid-tight connection with the casing or housing.

A cylindrical tube 12 is mounted in the casing or housing 10 in concentric spaced relation therewith. The cylindrical tube 12 forms the working chamber or cylinder of the shock absorber and has its lower end closed by means of a cylindrical plug 13 projecting into the tube 12 and provided exteriorly thereof with an enlarged annular flange 14 engaging an inturned flange at the lower end of the casing or housing 10; suitable means being employed to unite the flange 14, the flange on the lower end of the casing 10 and the cylinder 12 in fluid-tight engagement.

The plug 13 outwardly or downwardly of the flange 14 is provided with an eye portion 15 for connecting the shock absorber to one of the movable parts of the motor vehicle as, for example, to the axle thereof.

The upper end of the cylinder 12 is closed and sealed by a plug 16 extending into the cylinder and having at its upper end an annular flange overlying the end of the cylinder and circumferentially contacting the interior of the housing or casing 10 and provided with a plurality of circumferentially spaced openings 17 placing the space between the cylinder 12 and the housing or casing 10 and which space constitutes a reservoir into communication with a space 18 between the outer side of the plug 16 and the inner side of the cap 11.

A piston 19 is located in the cylinder 12 between the plugs 13 and 16 and said piston has a sliding substantially fluid-tight fit within the cylinder. Fixed to the piston 19 is a piston rod 20 that projects outwardly of the device through a central bearing opening in the plug 16 and through a suitable centrally disposed opening in the cap 11; it being noted that the cap 11 is so constructed adjacent said centrally disposed opening as to hold in position in the space 18 a packing gasket 21 which surrounds the piston rod 20 to prevent the escape of fluid from the device. The outer end of the piston rod 20 is provided with an eye portion 22 whereby said piston rod can be attached to a relatively movable part of the motor vehicle, such as the chassis or frame thereof as will be well understood.

It will be appreciated when the shock absorber is mounted in position upon a motor vehicle with the eye portion 15 of the plug 13 connected to the axle of the vehicle and with the eye portion 22 of the piston rod 20 connected to the chassis or frame thereof, that relative movements between the axle and chassis or frame of the vehicle will cause relative linear movements between the cylinder 12 and the piston 19.

The plug 13 is provided at its inner end with a centrally disposed counterbore or recess 23 from the bottom of which recess passages 24 and 25 extend toward the outer end of the plug and communicate with a passage 26 extending diametrically of the plug 13 and registering at its opposite ends with openings 27 formed in the cylinder 12. The passage 25 is located substantially at the central point of the recess or counterbore 23, while the passage 24 is located outwardly of the center of the recess, as clearly shown in Fig. 1.

An adjustable valve is mounted in the recess or counterbore 23 in the plug 13 and said valve is in the form of a plate 28 having a close but sliding fit in the recess or counterbore and provided in its circumferential edge with a plurality of circumferentially spaced recesses or notches 29 (see Fig. 2). The upper or inner side of the plate 28 is provided with a suitably shaped socket 30, in this instance of cylindrical cross-section, while on the underside of the plate 28 and arranged centrally thereof and bearing upon the bottom of the recess or counterbore 23 is an adjustment portion 31, the peripheral edge of which is of spiral formation. It will be seen that when the plate 28 is rotated in the recess or counterbore 23 the adjustment portion 31 will variably overlie to a greater or lesser extent the inner end of the passage 24 in the plug 13 and thus change or vary the effective size of said passage. Suitable means may be provided for holding the plate 28 in its different adjusted positions, and for this purpose the lower or outer side of the adjustment portion 31 has been illustrated as provided with a plurality of centrally arranged and circularly spaced recesses 32 cooperating with a spring-pressed ball 33 mounted in the plug 13 and acting as a spring point to engage various of the recesses 32 to hold the plate 28 in its different adjusted positions. In order to prevent the inward or upward dislodgement of the plate 28 from the recess or counterbore 23 a circular spring 34 may be secured in the wall of the counterbore or recess 23 at its upper or inner end, so as to overlie the peripheral edge of the plate. It will be understood that upon the downward stroke of the piston 19 in the cylinder 12 the pressure of the fluid causes the adjustment portion 31 of the plate 28 to bear upon the bottom of the counterbore or recess 23 and to close the passage 25, wherefore the fluid displaced by the piston rod 20 as it moves into the cylinder must flow through the circumferential recesses 29 in the plate 28 and through the passages 24 and 26 to the reservoir located between the casing or housing 10 and the cylinder 12.

Upon the upward movement of the piston in the cylinder the adjustment portion 31 of the plate 28 will be drawn by suction slightly away from the bottom of the counterbore or recess 23, wherefore the fluid will be drawn from the reservoir through the passage 26 and through both passages 24 and 25 into the cylinder 12 below the piston, it being understood that this unseating of the portion 31 of the plate 28 from the bottom of the counterbore or recess 23 is not sufficient to disengage the ball 33 of the spring point from the recess 32 in which it is seated, inasmuch as said ball follows the unseating movement of the plate, due to the spring urging it in such direction.

The plug 16 on its inner or lower side is provided with a recess or counterbore 35 similar to the recess or counterbore 23 in the plug 13, and a plate identical with the plate 28 and so designated in the drawings, is mounted in said recess or counterbore 35 and maintained against displacement downwardly and outwardly thereof by a circular spring 36 corresponding to the spring 34.

It will be understood that the spiral adjustment portion 31 of the plate 28 which is arranged in the counterbore or recess 35 in the plug member 16 is now located on the upper side of the plate and in engagement with the inner or upper end of the counterbore or recess 35 and overlies an opening or passage 37 in the plug 16 that communicates with the space 18 above the plug. The plate 28 in the recess or counterbore 35 can be held in adjusted position by means of a suitable spring point corresponding to the ball 33 and recesses 32 previously described in connection with the plate 28 that is located in the recess or counterbore 23. However, it is not believed necessary to illustrate such spring point in connection with the plug 16.

It will be understood that upward movement of the piston 19 in the cylinder causes the fluid to flow through the recesses 29 and through the opening or passage 37 into the space 18 and thence through the opening 17 into the reservoir. The spring 36 which holds the plate 28 in the recess 35 is so positioned with respect to the plate that the latter can be adjustably turned but will not move away from the upper end of the recess any substantial distance.

The piston 19 is provided with a passage 38 extending therethrough and including an enlarged portion in which is mounted a ball valve 39 which is held seated when the piston is moving toward the upper end of the cylinder 12 but which is unseated when the piston is moving in the opposite direction to allow a flow of the fluid through the passage 38 to the upper side of the piston. The piston 19 is provided on its upper side with a pin 40 and on its lower side with a similar pin 41, said pins being preferably but not necessarily in alignment with each other.

It will be seen that the plates 28 can be adjusted from exteriorly of the device in a very simple and expeditious manner which will now be explained.

Either the eye portion 15 of the plug 13 is disconnected from the part of the vehicle to which it is attached, or the eye portion 22 of the piston rod 20 is so detached, after which the relatively movable parts of the shock absorber can be moved to their limit of movement in one or the other direction. Assuming that said parts have been moved to their limit of movement in the outward or extended direction, the pin 40 on the upper side of the piston 19 can be engaged in the recess 30 of the plate 28 in the counterbore 35, whereupon relative rotation can be imparted to the piston and cylinder by rotating the part of the shock absorber which has been detached from the member to which it is normally connected, and such relative rotation of the piston and cylinder will act to turn said plate 28 and to vary the relationship between the spiral-shaped adjustment portion 31 of the plate and the opening 37 to increase or diminish the effective size of said opening as the case may be.

It will be understood that if it is desired to adjust the plate 28 that is located in the counterbore or recess 23, then the piston is relatively moved to the limit of its downward or inward movement in the cylinder 12 to engage the pin 41 on the underside of the piston with the recess 30 in the upper surface of the plate. In other words, when either of the pins 40 or 41 on the piston have been engaged with the cooperating recess in either of the respective plates 28, the piston will act as a wrench so that relative rotation between the piston and cylinder will cause a movement of the plates relative to the cylinder and plugs and thus change the relationship between the adjustment portions 31 of the plates and the openings with which they cooperate, the spring points acting to hold the plates in adjusted position.

It will be understood that in the normal operation of the shock absorber shown in Fig. 1 the relative reciprocating movements of the piston 19 in the cylinder 12 are not of such length as to bring the pins 40 and 41 into engagement with the plates 28. The only time that the pins 40 and 41 will engage with the plates is when the shock absorber has been completely collapsed or extended for the purpose of adjusting the plates.

Figure 3:
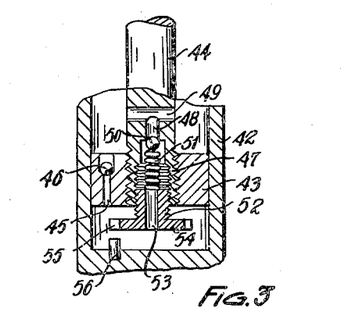
Fig. 3 is a fragmentary sectional view through a different form of retarding device embodying the invention from that shown in Fig. 1 and wherein the fluid flow control valve and its adjusting means are shown carried by the piston since they are mounted in the lower end of the piston rod.

A modified form of the invention is illustrated in Fig. 3. In this view the cylinder of the retarding device is indicated at 42 and the piston 43 slides therein with a substantially fluid-tight fit. The piston 43 includes a piston rod 44 to the inner end of which it is secured by any suitable means and locked against relative rotative movement with respect thereto. It will be understood that although the piston 43 is shown as screwed upon the threaded lower end of the piston rod 44 that it may be otherwise mounted on said rod, and furthermore that suitable means can be provided for locking the piston against relative rotative movement in position upon the end of the rod, such as by a locking pin or other suitable means.

The piston 43 is provided with a passage 45 therethrough and having an enlarged portion in which is mounted a ball valve 46, it being understood that upward movement of the piston, as viewed in the drawing, maintains said ball valve closed while downward movement thereof unseats the ball valve and allows the fluid to flow from beneath the piston through the passage 45 to the upper side thereof. The lower end of the piston rod 44 is provided with an internally threaded counterbore 47, having at its upper end a reduced counterbore communicating with a short passage 48 extending longitudinally of the rod and terminating in a transverse passage 49. The passage 48 is sealed during downward movement of the piston by a ball valve 50 located in the reduced counterbore at the upper end of the counterbore 47.

This valve is held in seated position by a coil spring 51 engaging at one end the valve and at its opposite end an adjustable abutment sleeve 52 which is externally threaded and screws into the threaded counterbore 47, it being noted that the abutment sleeve 52 is provided with a passage 53 extending therethrough. The lower end of the sleeve 52 is provided with an annular flange 54 having in its periphery one or more recesses 55 that cooperate when the piston is in its most inward position with a pin 56 secured to the bottom of the cylinder and projecting upwardly therein.

It will be understood that when the piston 43 is moved to its most inward or downward position in the cylinder and the pin 56 engaged with the recess 55 in the flange 54 that relative rotation of the cylinder and piston will cause a relative rotation between the sleeve 52 and the piston and piston rod 44 secured thereto and such relative rotation will cause the sleeve to screw inwardly or outwardly in the counterbore 47 to vary the tension of the spring 51 and hence the pressure required to unseat the valve 50 during the upward movement of the piston.

Figure 4:
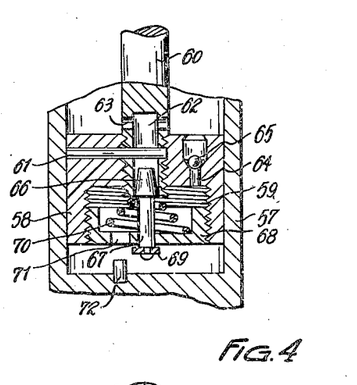
Fig. 4 is a view similar to Fig. 3 but on a larger scale and showing a different form of fluid flow control valve from that shown in Fig. 3, while the adjusting means for the valve is mounted in the piston and not in the piston rod.

In Fig. 4 the retarding device comprises a cylinder 57 and a piston 58 slidably mounted therein with a substantially fluid-tight fit. The piston 58 is provided with a centrally disposed opening that communicates with a threaded counterbore 59 located on the underside of the piston as viewed in the drawings. The piston rod 60 has its lower threaded end screwed into the opening in the piston and locked in position therein by means of a pin 61 extending radially of the piston and through said rod, wherefore the piston and rod cannot have relative rotation. The piston rod at its lower end is provided with a bore 62 communicating at its upper end with openings 63 extending laterally from the bore and placing the same in communication with the interior of the cylinder above the piston. The lower end of the piston rod 60 forms a valve seat and is located in the counterbore 59. A passage 64 extends through the piston from the counterbore to the upper end of the piston and is provided with an enlarged portion in which is located a ball valve 65 that seals the passage 64 upon upward movement of the piston, but becomes unseated when the piston is moving downwardly to allow the fluid to pass through the opening 64 to the upper side of the piston.

The bore 62 in the piston rod is sealed by a conical or tapered valve 66 that seats on the valve seat at the lower end of the rod and within the counterbore 59. This valve is provided with a valve pin 67 extending downwardly from the valve and through a centrally disposed opening in the bottom wall of a threaded cup-shaped adjusting member 68 that can be screwed inwardly or outwardly in the threaded counterbore 59. The lower end of the pin 67 below the bottom of the member 68 has secured thereto a head 69 which acts as a stop under the conditions later to be pointed out. A coil spring 70 surrounds the pin 67 and one of its ends seats on the bottom of the cup member 68 and its opposite end abuts the underside of the valve 66. The bottom of the cup member 68 is provided with an opening so that fluid can flow into and out of the counterbore 59, and for the further purpose of engaging the pin 72 that is mounted in the lower end of the cylinder 57 when the piston is at its lowermost position in the cylinder, wherefore relative rotation between the piston and cylinder will cause the member 68 to be screwed inwardly or outwardly as the case may be in the counterbore 59 and thus vary the tension on the spring 70.

It will be seen that when the member 68 is screwed outwardly of the counterbore it will engage the head 69 on the pin 67 and cause an outward or downward movement of the valve 66. If the parts are in the relative positions shown in Fig. 4 with the valve 66 fully seated, the outward screwing of the member 68 will move the valve downwardly, due to the engagement of the member 68 with the head 69, without any substantial variation in the tension of the spring 70.

It will be understood that when the valve has thus been moved downwardly, due to the conical shape of the valve, the opening between the periphery of the valve 66 and the end of the bore 62 in the piston rod will be increased in size depending upon the amount of downward movement of the valve, and hence a regulated or adjustable by-pass orifice around the valve is provided. Furthermore, the valve will at this time be spring-loaded so that when it is subjected to pressures exceeding a predetermined pressure upon the upward movement of the piston in the cylinder, the valve may open still further and against the action of the spring 70 to relieve such pressures. The use of the conical or tapered valve, the adjusting member 68 and the head 69 on the pin 67 enables a wide variety of different sized by-pass orifices or openings to be provided around the valve. The valve, therefore, acts as an adjustable orifice control or by-pass valve, but since it is under spring tension it also functions as an over-pressure or pop-off valve as well. It will likewise be noted that the member 68 can be screwed inwardly and outwardly in a manner to vary the tension of the spring 70, thus providing adjustment of the over-pressure or pop-off function of the valve.

From the foregoing it will be appreciated that the construction shown in Fig. 4 is such that by the provision of very simple means and without requiring material changes in the construction or fabrication of the device, the device can be adjusted so as to have any required diagrammatical characteristic, that is, it can have the characteristics of a mere by-pass valve, a mere pop-off or over-pressure valve, or a combination of both. This arrangement is extremely important in connection with shock absorbers for motor vehicles wherein different road conditions and different types of vehicle springs require adjustments of the shock absorber to be made to obtain the desired functional characteristics of the shock absorber. Likewise, some people prefer the riding characteristics given a vehicle by a relatively hard acting shock absorber, while others prefer riding characteristics obtainable from the use of shock absorbers with easy acting characteristics. Adjustment of the valve 66 in the shock absorber constructed in accordance with the showing of Fig. 4 will take care of obtaining the different characteristics desired or required.

Figure 5:
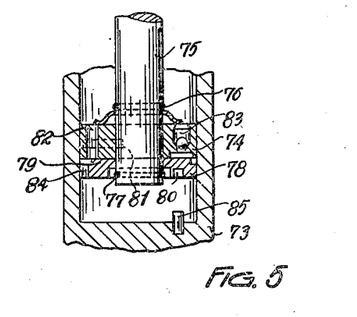
Fig. 5 is a view similar to Fig. 3 and illustrates a still different form of fluid control valve and adjusting means therefor in a retarding device embodying the invention.

In Fig. 5 the retarding device comprises a cylinder 73 in which the piston 74 is slidably mounted with a substantially fluid-tight fit. The piston rod 75 extends through an opening in the piston and is provided adjacent its lower end with spaced grooves lying on opposite sides of the piston and containing circular springs 76 and 77 for retaining the piston in position. A plate 78 similar to the plate 28 described in connection with the form shown in Fig. 1 forms an operative part of the piston and is mounted on the piston rod 75 intermediate the piston 74 and the circular spring 77, with the spiral adjustment portion 79 of the plate that corresponds to the portion 31 of the previously described plate engaging the under or lower face of said piston, while the under or lower side of the plate is provided with a recess 80 corresponding to the recess 30 in the plate 28. The piston 74 is held against rotation relative to the rod 75 by a pin 81 and is provided with an opening 82 extending therethrough, the effective size of which is controlled or determined by the relationship between it and the spiral adjustment portion 79 of the plate 78. The piston 74 is also provided with an opening 83 therethrough and having an enlarged portion in which is located a ball valve.

It will be seen that upon upward movement of the piston the fluid flows through the passage 82 and through the circumferential recesses 84 in the plate 78 and corresponding to the recesses 29 in the plate 28. Upon downward movement of the piston in the cylinder the ball valve in the passage 83 unseats and fluid is free to flow from the underside of the piston through the recesses 84 and said passage 83 to the upper side thereof as well as through the passage 82. When the piston is in its fully collapsed or most inward position the recess 80 in the plate 78 can be engaged with the pin 85 carried by the lower end of the cylinder and projecting upwardly into the interior thereof, wherefore relative rotation between the cylinder and piston will effect an adjusting rotation of the plate 78 to vary the relationship of the spiral adjustment portion 79 thereof with respect to the passage 82 to change the effective size of the latter, it being understood that suitable means such as spring points can be provided to hold the plate in adjusted position.

In the forms of the invention heretofore described the adjustment of the fluid flow control valve or valves must take place when the piston is at one or the other limit of its relative movements in the cylinder. In the form now to be described and illustrated in Figs. 6 and 7, the fluid flow control valve can be adjusted when the piston is in any of its positions relative to the cylinder, that is, it is unnecessary in this modified form of construction to completely collapse or extend the relatively movable piston and cylinder.

Figure 6:
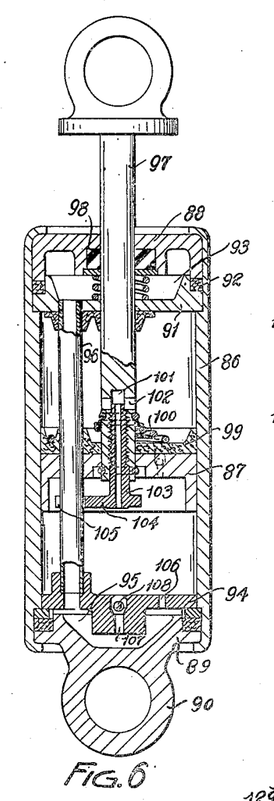
Fig. 6 is a longitudinal sectional view similar to Fig. 1; through a modified retarding device, the device shown in Fig. 6 embodying a modified form of construction from any previously shown in that the fluid control valve can be adjusted at any point in the relative movements of the piston and cylinder.
Figure 7:
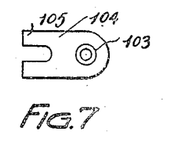
Fig. 7 is a detached detail top plan view of one of the parts of the retarding device shown in Fig. 6.

In Fig. 6 the retarding device comprises a cylindrical casing 86 in which the piston 87 is slidably mounted. The casing or cylinder 86 is closed at its upper end, as viewed in the drawing, by a closure member 88 and at its lower end by another closure member 89 having an eye portion 90, by means of which the cylinder can be connected to one of the relatively movable parts of the mechanism or apparatus with which the device is used, as, for example, to the axle of a motor vehicle.

Inwardly of the closure member 88 there is mounted in the cylinder a plug 91, a suitable gasket 92 being positioned intermediate the member 88 and the plug 91 to provide a fluid-tight seal. The space between the member 88 and the plug 91 indicated at 93 constitutes a reservoir space. In the cylinder at its lower end and above the member 89 is a plug 94, while the space between the member 89 and plug 94 and indicated at 95 also constitutes a reservoir space. The two reservoir spaces 93 and 95 are connected by a tube 96 mounted at one end in an opening formed in the plug 91 and at its opposite end is an opening extending through the plug 94 and a boss formed on the upper side thereof. The piston 87 includes a piston rod 97 to the lower end of which it is secured for rotation relative thereto. The piston rod 97 extends through openings in the member 88 and plug 91 to the exterior of the device, suitable packing 98 surrounding the rod and carried by the member 88 as well as suitable packing secured to the inner side of the plug 91 and surrounding the rod and the tube 96 preventing the escape of fluid around the rod.

The piston 87 is held against relative rotation with respect to the cylinder 86 by the tube 96 which extends through an opening in the piston eccentrically with respect to the rod 97. The piston on its upper side, as viewed in the drawing, is provided with a cup-shaped packing member 99 held in engagement with the piston by means of a spring 100, such packing member being provided with an opening through which the tube 96 extends. The lower end of the rod 97 is provided with a bore 101 which is in communication at its upper end with the interior of the cylinder above the piston by means of laterally extending openings 102.

The bore 101 is threaded to receive an externally threaded adjustable valve member 103 that is screwed into the bore and has its upper reduced end controlling the effective size of the openings 102. The valve 103 is provided with a centrally disposed passage placing the bore 101 in communication with the interior of the cylinder below the piston. The lower end of the valve 103 carries a laterally extending arm 104 at the outer end of which is a forked portion 105 that straddles the tube 96.

It will be seen that when the piston rod 97 is rotated relative to the cylinder 86 the piston 87 and the valve 103 are held against rotation relative to the cylinder by the tube 96, and hence the rotation of the piston rod acts to screw the valve inwardly or outwardly of the bore 101 so that the upper end of the valve will change the effective area of the openings 102 to allow a relatively free or a more restricted flow of fluid through said openings and into the bore 101.

The plug member 94 is provided with an opening 106 communicating with the interior of the cylinder and with the reservoir space 95. The plug 94 is also provided with a centrally disposed opening 107 communicating with the interior of the cylinder and the reservoir space 95, and having an enlarged portion in which is mounted a valve 108. During the collapsing or downward stroke of the piston the fluid displaced by the rod 97 is forced through the opening 106 into the reservoir space 95 and thence into the tube 96 and the reservoir space 93. During the downward movement of the piston the valve 108 controlling the passage 107 is closed. During the upward or extension stroke the fluid which had previously been displaced by the piston rod is drawn back into the cylinder from the spaces 95 and 93 and the tube 96 through the opening 106 and the opening 107, the valve 108 at this time being unseated.

Figure 8:
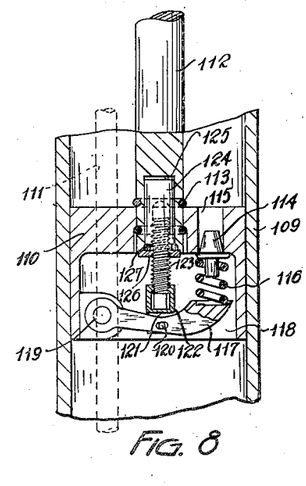
Fig. 8 is a fragmentary longitudinal sectional view through a different form of retarding device from any previously illustrated and embodying the invention.

In the form shown in Fig. 8 the cylinder is indicated at 109 and has a piston 110 slidably mounted therein, this piston being held against rotation relative to the cylinder by means of a tube 111 corresponding to the tube 96 shown in Fig. 6 and passing eccentrically through the piston and having its opposite ends in communication with reservoir spaces corresponding to the spaces 93 and 95 in Fig. 6.

A piston rod 112 has its lower end rotatably mounted in the piston 110 by suitable means, such as the circular springs 113 carried in grooves formed in the rod and located on opposite sides of a portion of the piston. The flow of fluid passing from the cylinder above the piston to the cylinder below the piston is controlled by a conical or tapered valve 114 located in the opening 115 through the piston. The valve 114 is spring-tensioned by a spring 116, the tension of which can be adjusted by a control lever 117. The spring 116 and the control lever 117 are located in a counterbore 118 formed on the underside of the piston, said lever 117 being pivotally supported by an eye mounted on a pin 119 carried by inwardly extending lugs or ears formed on the piston within the counterbore 118.

Approximately midway of its opposite ends the lever 117 is connected by a pin 120 extending through an opening in the lever to a forked portion 121 on the lower end of a member 122. This member 122 is connected to a threaded shaft 123 which extends into a cylinder 124 and is connected thereto by easy going or loose threads indicated by dotted lines in the drawings. The cylinder 124 is movably mounted in a bore 125 in the lower end of the rod 112 but has a relatively tight fit therein. The cylinder is held against displacement from the bore 125 by a plate 126, there previously being interposed between the inner side of the plate and the end of the cylinder anti-friction members 127 in the form of small balls.

When there is no pressure in the cylinder the piston rod 112 can be rotated relative to the piston and relative to the cylinder 124 mounted in the bore 125 at the lower end of the rod. By collapsing or moving the piston inwardly of the cylinder to some extent sufficient pressure can be created in the cylinder below the piston to press the cylinder 124 fully into the bore 125 in the piston rod 112 and thus create additional frictional contact between the cylinder 124 and the piston rod, so that the rotation of the piston rod will cause the cylinder to rotate therewith, wherefore the threaded shaft 123 will be screwed inwardly or outwardly of the cylinder 124 to thus move the lever 117 about its pivotal mounting, with a consequent alteration in the tension of the spring 116 which controls the valve 114.

It will be seen that the valve 114 can be adjusted from exteriorly of the device by merely moving the piston inwardly of the cylinder far enough to create sufficient pressure to cause the cylinder 124 to rotate with the piston rod 112.

Figure 9:
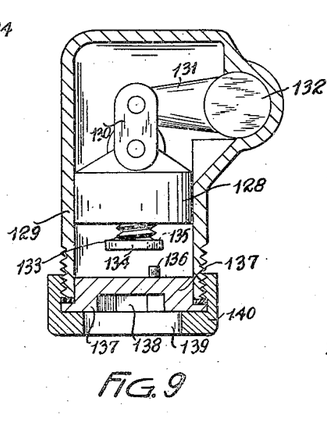
Fig. 9 is a sectional view through a retarding device of the so-called link and lever type as distinguished from the direct acting type and embodying the invention.

In Fig. 9 the retarding device is shown as a single acting shock absorber of the link and lever type and in which the adjustable valve is located in the piston 128 that is slidable in the cylinder 129. The piston 128 is not rotatable relative to the cylinder 129, and is reciprocated therein by means of the link 130 pivotally connected to the piston and to a lever 131 forming part of an actuating shaft 132 as will be well understood.

The adjusting means for the valve may be in the form of a screw 133 that can be screwed inwardly or outwardly of the piston 28 as, for example, an adjusting screw similar to the member 52 in Fig. 3 or the member 103 in Fig. 6. The screw 133 is provided at its lower end with a head 134 having an opening or recess 135 adapted to cooperate with a pin 136 extending upwardly from a member 137 that closes and seals the lower end of the cylinder 129. This member 137 is rotatable relative to the cylinder 129 and is provided for purposes of rotation with a wrench socket 138 accessible through an opening 139 formed in a clamping collar 140 that is screwed onto the lower end of the cylinder 129. It will be seen that when the clamping collar 140 is slightly loosened and the piston brought down to the lower end of the cylinder to engage the pin 136 with the opening 135 in the head of the screw 133, then the member 137 can be rotated relative to the cylinder to cause an inward or outward adjusting movement of the screw 133.

From the foregoing explanation of different embodiments of the invention it will be seen that the present invention provides in a fluid retarding or braking device means whereby the valve or valves controlling the flow of fluid upon relative linear movements of the cylinder and piston can be readily adjusted from exteriorly of the device without requiring the provision of openings therein or the disassembling thereof.

Furthermore, retarding devices embodying the invention will be of economic construction, since it will not be necessary to provide openings or closure members and packings therefor for the purpose of adjusting the fluid control valve or valves. Likewise, since the devices are not provided with valve adjusting openings the leakage of fluid from the cylinders thereof can be reduced to a minimum with a consequent improvement in the functioning of the device. It will further have been observed that the adjustment of the valve or valves can be obtained in a device embodying the invention either when the piston is at its limits of movement in opposite directions in the cylinder or at any point in its relative linear movement in the cylinder.

In addition to the form of the invention relating to the adjustment of the fluid flow control valve or valves from the exterior of the devices, particular importance is attached to that phase of the invention illustrated specifically in Fig. 4 and covering the provision in a fluid retarding device of a fluid flow control valve and adjusting means therefor of such character that the device can have in operation any desired or required diagrammatical characteristics, such as a mere over-pressure or pop-off diagram, a mere by-pass diagram or various combinations of both of these diagrams.

Figure 10:
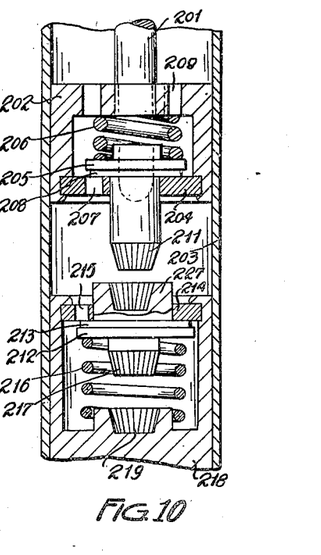
Figs. 10 and 11 are fragmentary longitudinal sectional views through still different forms of retarding devices embodying the invention.

In Fig. 10 there is disclosed a form of retarding device embodying the present invention and wherein both the high pressure side and the low pressure side can be regulated independently of each other after the relatively movable parts of the device have been collapsed or compressed to approximately their shortest length. In this form of retarding device the low pressure side is first regulated and then upon a slightly further collapsing or compressing of the device the high pressure side may be regulated.

In the form shown in Fig. 10 there is the piston rod 201 which carries the piston 202 that slides in the cylinder 203. The piston 202 carries on its lower end a plate 204 against which the regulating body or valve 205 is pressed by the coil spring 206. The plate 204 has a bore 207 which can be more or less covered by the spiral-like regulating portion 208 of the regulating body or valve 205 that is similar to the portion 31 of the plate or valve 28, see Figs. 1 and 2. The piston 202 is provided with bores 209 through which the liquid can flow and thus have access to the regulating bore 207. The body or valve 205 carries on its underside a conical pin 211 that projects through an opening in the plate 204 and has its lower end serrated. It will be understood that the liquid in the cylinder 203 above the piston rod 202 and which is displaced by the upward movement of the piston, flows either to the underside of the piston through the bores 209 and the regulating bore 207 or, in part, it may flow to a suitable reservoir or to a by-pass connecting the upper end of the cylinder with the lower end. This arrangement has not been illustrated since it is well known in the art.

The lower end of the working chamber of the cylinder 203 is closed by means of the closure member 218 located on the inside of the cylinder and provided with a counterbore or recess at its inner or upper end. The member 218 is provided with a fixed plate 214 that has a regulating bore 215 therethrough. A regulating body or valve 212, similar to the body or valve 205 previously referred to, bears against the underside of the plate 214 under the influence of the coil spring 216, and this body or valve 212 has a spiral-like regulating portion 213 that regulates the effective size or cross-sectional area of the bore 215. The body or valve 212 is provided on its upper side with a boss 227 that projects through an opening in the plate 214 and is provided with a conical recess complementary to the pin 211 of the high pressure valve 205 and interiorly serrated so as to interlock with said pin when the latter is positioned in the recess. The body or valve 212 on its underside is provided with a conical serrated pin 217 that cooperates with a conical serrated recess 219 formed in a boss projecting outwardly from the bottom of the counterbore in the member 218.

The spring 206 that acts on the high pressure regulating body or valve 205 is considerably stronger than the spring 216 that acts on the low pressure regulating valve or body 212, wherefore it will be obvious that the regulating body or valve 212 can be turned relative to its associated plate more readily than the regulating valve or body 205. It will be understood that the liquid displaced by the piston 202 as it moves toward the low pressure side of the device passes through the bore 215 and into the counterbore in the member 218, and that suitable passages may be provided in the member 218 to carry such liquid to a reservoir or to a by-pass connected with the high pressure side of the device. Inasmuch as such an arrangement is well known and is illustrated in other forms of the invention disclosed herein, it has been omitted in Fig. 10 for the purposes of brevity.

The regulation of the low pressure side and of the high pressure side of the device is made as follows: The device is compressed or collapsed, that is, the piston 202 is moved toward the low pressure end of the cylinder 203 until the conical pin 211 caried by the body or valve 205 engages in the recess formed in the boss 222 of the body or valve 213. Then the cylinder 203, piston 202 and piston rod 201 are rotated relative to each other and such relative rotation due to the friction between the valve body 205 and the plate 204 occasioned by the action of the strong spring 206 causes the valve body 205 to move as a unit with the piston 202, wherefore no adjustment is effected of the bore 207. However, since the conical pin 211 is in engagement with the recess in the boss 227 of the body or valve 212 and such valve or body is retained by the weak spring 216 against the plate 214 with a relatively low friction, it will be seen that the relative movement of the cylinder and piston overcomes this low friction and causes the valve body 212 to rotate relative to the plate 214, wherefore the spiral portion 213 will vary the effective cross-sectional area of the bore 215 and thus adjustably change or regulate the low pressure side of the device. In other words, the plate 204, body or valve 205, spring 206, pin 211 and the recess in the body or valve 212 acts as a friction clutch to cause a relative rotation between the plate 214 and the spiral portion 213 of the body or valve 212.

In order to adjust the high pressure body or valve 205 the device is still further collapsed or compressed, wherefore the action of the spring 216 is overcome and the body or valve 212 moved toward the bottom of the counterbore in the member 218 until the pin 217 carried by the body or valve engages in the recess 219. When this occurs it will be apparent that the body or valve 212 cannot rotate relative to the member 218 and, in turn, the valve body 205, through the engagement of the pin 211 in the recess of the boss 227, cannot rotate relative to the valve body 212, wherefore relative rotation of the piston and cylinder will overcome the action of the spring 206 and result in a relative rotation of the plate 204 and the valve body 205 to cause the spiral-like portion 208 of such body to change or regulate the effective cross-sectional area of the bore 207.

Figure 11:
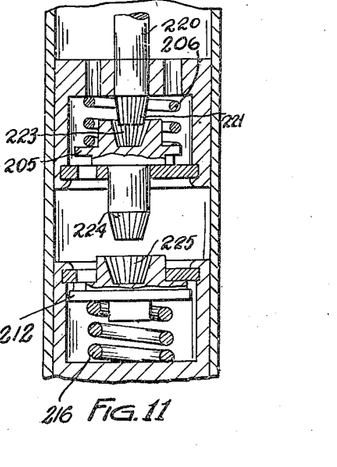

In Fig. 11 there is disclosed a still different form of the invention and one wherein the high pressure regulating body or valve may first be adjusted, and then the low pressure regulating body or valve adjusted upon the device being collapsed or compressed. This difference over the structure shown in Fig. 10 is effected by utilizing a weaker spring for holding the high pressure regulating body or valve in position than is employed in holding the low pressure regulating body or valve in position.

In Fig. 11 the high pressure regulating body or valve 205 can turn more easily than the low pressure regulating body or valve 212. The manner in which the valves are regulated in the form shown in Fig. 11 is as follows: The piston is moved toward the low pressure end of the cylinder until the serrated conical pin 224 carried by the high pressure regulating body or valve engages in the conical serrated recess 225 on the low pressure regulating body or valve. When this engagement has taken place relative rotation between the piston and cylinder will cause the high pressure regulating body or valve to rotate relative to its associated plate and thus change the effective area of the bore through said plate. This relative rotation of the high pressure regulating body or valve is due to the fact that the relatively strong spring acting on the low pressure regulating body or valve creates substantial friction between said body or valve and its associated plate, and since the high pressure regulating body or valve is connected with the other body or valve through the pin 224 and recess 225, the friction set up by the weaker spring in the piston is insufficient to cause the high pressure regulating body or valve to move with the piston and there is a slippage or relative rotation between said high pressure regulating body or valve and its associated plate. Upon further compression of the device, that is the movement of the piston toward the low pressure end, and due to the weakness of the spring in the piston as compared to the spring acting on the low pressure regulating body or valve, the high pressure regulating body or valve will be moved away from its associated plate until the serrated recess 223 formed therein receives the serrated conical point 221 on the end of the piston rod 220. When this takes place upon relative rotation between the piston, piston rod and the cylinder a positive driving relationship exists between the piston rod and piston and the low pressure regulating body or valve through the high pressure regulating body or valve, and consequently relative rotation of the piston rod and piston and the cylinder overcomes the friction between the low pressure regulating body or valve and its associated plate and causes said body or valve to rotate relative to said plate and to thus change or regulate the effective cross-sectional area of the bore through said plate.

Although a number of preferred embodiments of the invention have been illustrated and described herein it should be understood that the invention is not to be limited thereto but is susceptible of various modifications and adaptations within the scope of the appended claims.

Having thus described my invention I claim:

1. In a fluid retarding or braking device, a cylinder member, a piston member relatively slidable therein and including a piston rod having a passage therethrough from one side of said piston member to the other side thereof, a valve controlling said passage, a spring urging said valve to closed position, means threadedly associated with said piston member for varying the tension of said spring, and means carried by said cylinder and cooperating with said first named means when said piston is in a predetermined position and upon relative rotation between said members to cause movement of said means relative to said piston to adjust the tension of said spring.

2. In a fluid retarding or breaking device, a cylinder member, a piston member relatively slidable therein, one of said members being provided with a passage through which fluid flows upon relative sliding movement between said members, a tapered or conical valve controlling the flow of fluid through said passage, means for adjusting the relationship of said valve with respect to said passage to provide different size by-pass openings around the valve, a spring urging said valve toward operative position and imparting to said valve the characteristics of a pop-off or over-pressure valve, said means also adjusting the tension of said spring, said cylinder member and said piston member being provided with means cooperating with each other in a predetermined relative position of said piston member in said cylinder member and upon relative rotation of said members to effect an actuation of said valve-adjusting and spring-tensioning means.

3. In a fluid retarding or braking device a cylinder member, a piston member relatively slidable therein, valve means having both the characteristics of a by-pass valve and a pop-off or over-pressure valve for controlling the flow of fluid caused by sliding movement of said piston member in said cylinder member, means for adjusting said valve to vary one or the other or both of its characteristics, and means carried by said members and cooperating when said piston member is in a predetermined position in said cylinder member and upon relative rotation of said members to effect an actuation of said valve-adjusting means.

4. In a direct acting hydraulic shock absorber, a cylinder member, a piston member relatively slidable therein and including a piston rod having a passage therethrough from one side of said piston member to the other side thereof, a valve normally seating against one end of said rod and controlling said passage, a spring urging said valve to seated position, means threadedly associated with said piston member for varying the tension of said spring, and means carried by said cylinder and cooperating with said first named means when said piston is in a predetermined position in the cylinder and upon relative rotation between said members to cause movement of said means relative to said piston to adjust the tension of said spring.

5. In a direct acting hydraulic shock absorber, a cylinder member, a piston member relatively slidable therein, valve means having both the characteristics of a by-pass valve and a pop-off or over-pressure valve for controlling the flow of fluid caused by sliding movement of said piston member in said cylinder member, means carried by said piston member for adjusting said valve to vary one or the other or both of its characteristics, and means carried by said cylinder adjacent one end thereof and cooperating with said adjusting means carried by said piston when the latter is in a predetermined position in said cylinder member and upon relative rotation of said members to effect an actuation of said valve-adjusting means.

FRITZ ALBERT DEUTSCH.